United States Patent
Robinson

(10) Patent No.: US 6,523,902 B2
(45) Date of Patent: Feb. 25, 2003

(54) HEADREST OF ADJUSTABLE HEIGHT FOR A MOTOR-VEHICLE SEAT

(75) Inventor: Michael Robinson, Cumiana (IT)

(73) Assignee: Fiat Auto S.p.A., Turin (IT)

( * ) Notice: Subject to any disclaimer, the term of this patent is extended or adjusted under 35 U.S.C. 154(b) by 0 days.

(21) Appl. No.: 09/818,531

(22) Filed: Mar. 28, 2001

(65) Prior Publication Data

US 2001/0026092 A1 Oct. 4, 2001

(30) Foreign Application Priority Data

Mar. 28, 2000 (IT) .......................... TO00A0285

(51) Int. Cl.⁷ ................................. B60N 2/48
(52) U.S. Cl. .................... 297/410; 297/216.12
(58) Field of Search ............... 297/216.12, 410

(56) References Cited

U.S. PATENT DOCUMENTS

| | | | |
|---|---|---|---|
| 3,366,417 A | * | 1/1968 | Belk .......................... 297/397 |
| 3,462,193 A | | 8/1969 | Tamura |
| 3,655,241 A | * | 4/1972 | Herzer et al. ............... 297/408 |
| 3,813,151 A | | 5/1974 | Cadiou |
| 4,693,515 A | * | 9/1987 | Russo et al. ................ 297/391 |
| 4,761,034 A | * | 8/1988 | Saito .......................... 297/408 |
| 4,865,388 A | * | 9/1989 | Nemoto ...................... 297/403 |
| 5,385,384 A | * | 1/1995 | Gierman et al. ............ 297/238 |
| 6,076,208 A | * | 6/2000 | Heimbrock et al. .......... 5/613 |
| 6,213,548 B1 | * | 4/2001 | Van Wynsberghe et al. ..... 297/216.12 |

FOREIGN PATENT DOCUMENTS

| | | |
|---|---|---|
| DE | 42 27 697 A | 2/1994 |
| DE | 196 43 266 C | 5/1998 |
| DE | 197 22 785 A | 12/1998 |

* cited by examiner

Primary Examiner—Peter M. Cuomo
Assistant Examiner—Joseph Edell
(74) Attorney, Agent, or Firm—Sughrue Mion, PLLC

(57) ABSTRACT

A headrest includes a support structure adjustable in height of an actuator and defining a curved surface the convex side of which faces upwards, a pad fixed to the backrest at the front and slidable on the curved surface, and having a rear portion arranged for sliding vertically adjacent the rear of the backrest during the adjustment movement, and a guide device for guiding the rear portion of the pad and keeping it oriented parallel to the backrest.

5 Claims, 1 Drawing Sheet

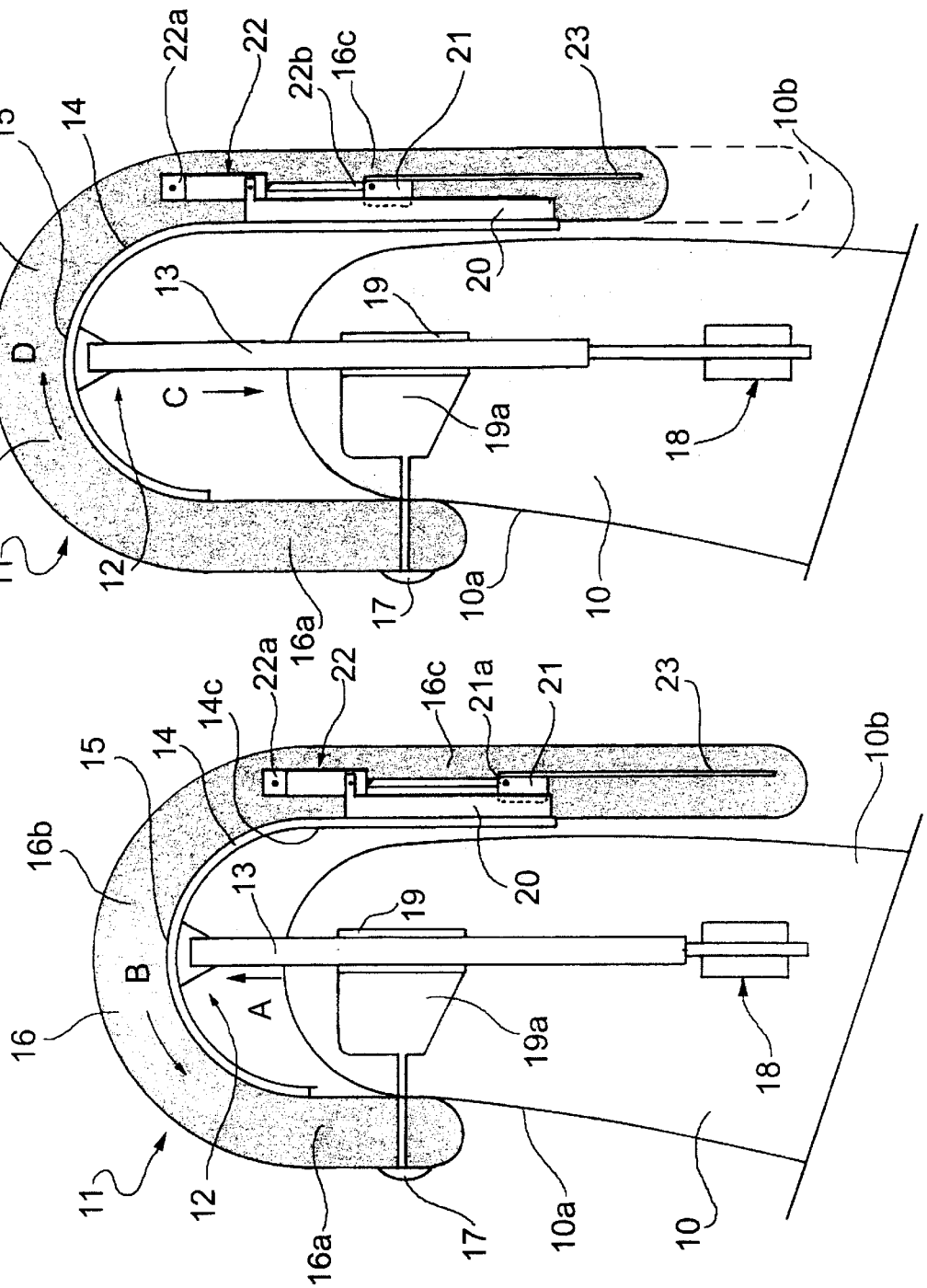

HEADREST OF ADJUSTABLE HEIGHT FOR A MOTOR-VEHICLE SEAT

BACKGROUND OF THE INVENTION

The present invention relates to a headrest of adjustable height for a motor-vehicle seat.

SUMMARY OF THE INVENTION

The object of the present invention is to provide an improved headrest of adjustable height which is functional and aesthetically pleasing.

This object is achieved, according to the present invention, by a headrest comprising a substantially rigid support structure defining a curved surface the convex side of which faces upwards, along the profile of a headrest, actuating means for raising and lowering the support structure along an axis substantially parallel to the backrest of the seat, a pad element superimposed for sliding on the curved surface and having a front portion which can be fixed to the backrest and a rear portion arranged for sliding vertically adjacent the rear of the backrest during the adjustment movement between the said positions, and a guide device associated with the rear position of the pad element for guiding the rear portion and keeping oriented along an axis substantially parallel to the backrest.

BRIEF DESCRIPTION OF THE DRAWINGS

The structural and functional features and the advantages of a preferred embodiment of the headrest according to the present invention will become clear in the course of the following detailed description, given with reference to the appended drawings, provided purely by way of non-limiting example, in which:

FIG. 1 is a longitudinal, vertical section of a headrest according to the invention, fitted on the backrest of a motor-vehicle seat, and FIG. 2 is a view similar to FIG. 1 showing the headrest in section, in a raised position relative to that of FIG. 1.

DETAILED DESCRIPTION OF THE INVENTION

With reference initially to FIG. 1, the backrest of a motor-vehicle seat, indicated 10, has a front surface 10a and a rear surface 10b which are substantially vertical.

A headrest according to the present invention, generally indicated 11, is mounted on top of the backrest 10. The headrest 11 comprises a substantially rigid structure 12, including a substantially vertical rod 13 fixed at its top to a rigid support element 14 arranged around the periphery of the top of the backrest and defining a surface 15 having a substantially inverted J-shape extending in the direction perpendicular to that of the drawing in FIG. 1.

The surface 15, which is curved with its convex side facing upwards, constitutes a support and sliding surface for a pad element 16 of soft and flexible material formed substantially in the shape of a saddle completely covering the support element 14. The pad 16 has a front portion 16a fixed to the backrest 10 of the seat by means of a fixing element 17, an upper, central portion 16b superimposed on and in contact with the curved surface 15, and a rear portion 16c which extends downwards, covering the upper portion of the rear surface 10b of the backrest.

The vertical rod-like element 13 can translate vertically by means of an actuator 18, for example, an electrical actuator, and is guided in its vertical movement by a guide 19 disposed inside the backrest and fixed to the structure thereof.

The terms "vertical", "raised", and "lowered" are intended to refer herein to the plane in which the backrest 10 of the seat lies, upon the understanding that the backrest may be reclinable and may therefore adopt an orientation other than vertical.

In the preferred embodiment shown in the drawings, the guide element 19 for the rod 13 forms, at the front, a lug 19a which projects forwards towards the front surface 10a of the backrest to constitute an anchorage for the fixing element 17 which secures the front edge portion 16a of the pad element 16.

By activating the electrical actuator 18, it is possible to raise and lower the structure 12 and the pad 16, changing from the position of FIG. 1 in which the headrest is lowered, to the position of FIG. 2 in which the headrest is raised, and vice versa, the structure 12 preferably being able to reach and stop at a plurality of intermediate heights between those described herein as the fully lowered position (FIG. 1) and the fully raised position (FIG. 2).

As stated, in longitudinal section, the rigid element 14 has an inverted J-shape the rear portion of which extends downwards for a greater distance than the front portion. The rigid element 14 is preferably formed by a body of rigid material (for example, of sheet metal), the substantially vertical rear portion 14c of which is integral with or fixed firmly to a vertical guide means, schematically indicated 20.

In an alternative embodiment (not shown), the vertical guide 20 may be formed by a vertical slot formed in the element 14.

In any case, the guide means 20 will be formed in a manner such as to permit the engagement for vertical sliding of a rear sliding block 21, fixed to the rear pad portion 16c or, as shown, incorporated within it.

The sliding block 21 is also connected at 21a to a resiliently deformable element 22 which, together with the guide 20 and the sliding block 21, constitutes a device which serves to guide the rear portion 16c of the pad vertically along an axis substantially parallel to that of the backrest 10, in particular, of the rear surface 10b of the backrest.

The resilient element 22 which, in the embodiment illustrated, is a gas spring, has an upper end 22a fixed to the top of the guide 20 or to the portion 14c of the element 14 and a lower end 22b fixed to the sliding block 21.

The sliding block 21 carries a substantially flat element 23 which projects downwardly, parallel to the rear lob of the backrest, and which is incorporated in the rear portion 16c of the pad, extending as far as the lower end region of this portion.

The headrest according to the invention operates as follows.

In order to raise the headrest 11 and thus to change from the configuration shown in FIG. 1 to that shown in FIG. 2, the electric motor 18 is activated by means of a control disposed in a remote position (not shown), causing the rod 13 to be raised vertically as indicated by the arrow A in FIG. 1. During this stage, the pad 16, which is anchored to the seat at 17 at the front, slides along the arcuate surface 15 as indicated by the arrow B in FIG. 1. During this movement, the sliding block 21 is pulled upwards, together with the rear portion 16c of the pad, and slides in the guide 20, compressing the resilient element 22, in opposition to the resilient force thereof.

The configuration shown in FIG. 2, in which the headrest 11 is raised, is thus reached. In order to lower the headrest, the electric motor 18 is operated in the opposite direction so as to cause the rod 13 to move downwards in the direction indicated by the arrow C in FIG. 2. The pad 16 tends to slide, moving anticlockwise (in its upper portion 16b) on the curved surface 15, as indicated by the arrow D; during this stage, the resilient element 22 is free to extend, thus urging downwards its own lower end 22b, which is guided by the sliding block 21 that slides along the guide 20.

Whilst this movement is taking place, as will be appreciated, the elements 20, 21, 22 and 23 cooperate to prevent the portion 16c from sticking during its downward movement and guide it downwards, keeping it adjacent the rear side 10b of the backrest.

The pad 16 is preferably wrapped in a covering (not shown) of material suitable for limiting the friction between the pad and the curved surface 15 to low values.

It will be noted that the rear edge portion 16c of the pad covers the upper portion of the rear 10b of the backrest (FIG. 2) even when the headrest is in the fully raised position.

What is claimed is:

1. A headrest for a motor-vehicle seat, of the type which can be adjusted in height between at least one low position and at least one high position, the headrest including:

a substantially rigid support structure defining a curved surface the convex side of which faces upwards, along the profile of a headrest, actuating means for raising and lowering the support structure along an axis substantially parallel to the backrest of the seat, a pad element superimposed for sliding on the curved surface and having a front portion which can be fixed to the backrest and a rear portion arranged for sliding vertically adjacent the rear of the backrest during the adjustment movement between said positions, a guide device associated with the rear portion of the pad element for guiding the rear portion and keeping said rear portion oriented along an axis substantially parallel to the backrest, the guide device comprises at least one sliding block element fixed to the rear portion of the pad and slidable along at least one respective guide means substantially parallel to the backrest and fixed to the support structure, the sliding block carrying a substantially flat element which projects downwards parallel to the rear of the backrest and is incorporated in the rear portion of the pad, extending as far as the end portion thereof, and a resiliently compressible element acting between the support structure and the rear portion of the pad in order to urge the rear portion downwards in a guided manner when the support structure is lowered.

2. The headrest of claim 1, wherein the resiliently compressible element is restrained, in a first region thereof, on the sliding block and, in a second region thereof, is restrained on the support structure or on the guide means.

3. The headrest of claim 1, wherein the resiliently compressible element has a first, upper end restrained on the support structure or on the guide means and a second, lower end restrained on the sliding block.

4. The headrest of claim 1, wherein the support structure includes a rigid support element having a substantially inverted J-shaped longitudinal vertical cross-section defining the curved surface.

5. The headrest of claim 1, wherein the pad is of a size such that said rear portion covers the upper portion of the rear of the backrest, even when the headrest is in the fully raised position.

* * * * *